United States Patent [19]

Rubinstein

[11] Patent Number: 4,680,837
[45] Date of Patent: Jul. 21, 1987

[54] PLASTIC SWIVEL CONNECTOR AND MOLD THEREFOR

[76] Inventor: Leon Rubinstein, 9 Fox Hill Dr., Natick, Mass. 01760

[21] Appl. No.: 816,101

[22] Filed: Dec. 23, 1985

[51] Int. Cl.$^4$ .............................................. A44B 13/00
[52] U.S. Cl. .............................. 24/237; 24/230.5 AD; 24/236; 264/242; 403/209
[58] Field of Search .................. 24/236, 237, 230.5 R, 24/230.5 AD; 403/209; 264/161, 242

[56] References Cited

U.S. PATENT DOCUMENTS

| | | | |
|---|---|---|---|
| 641,265 | 1/1900 | Brassington | 24/230.5 AD |
| 677,626 | 7/1901 | Booth | 24/230.5 AD |
| 1,224,744 | 5/1917 | Holcom | 24/230.5 AD |
| 1,804,377 | 5/1931 | Freysinger | 24/236 |
| 2,577,350 | 12/1951 | Morin | 264/161 |
| 3,512,223 | 5/1970 | Willinger | 403/209 |
| 3,941,495 | 3/1976 | Duncan | 264/242 |
| 3,961,770 | 6/1976 | Wrasman | 264/242 |
| 3,995,822 | 12/1976 | Einhorn et al. | 24/230.5 AD |
| 4,064,604 | 12/1977 | Hartman | 403/209 |
| 4,579,709 | 4/1986 | Ferreri | 264/242 |

Primary Examiner—Victor N. Sakran
Attorney, Agent, or Firm—Francis J. Caufield

[57] ABSTRACT

A plastic swivel connector for releasably attaching articles together and a mold are provided in complementary architectures which permit the connector to easily be injection molded in a one-shot process with substantial reductions in cycle time and post molding operations compared with other processes for fabricating parts of similar complexity and function. In preferred form, the connector comprises two major parts with one attachable to a garment bag strap and the other clippable to a ring on the bag. One of the connector parts has two intersecting spaces which provide access for interfacing cavity portions that define the connector swivel features and along with other cavity surfaces permit the connector parts to be molded in sequential fashion within the cavity while retaining their identity as separate rotatable parts upon ejection.

15 Claims, 8 Drawing Figures

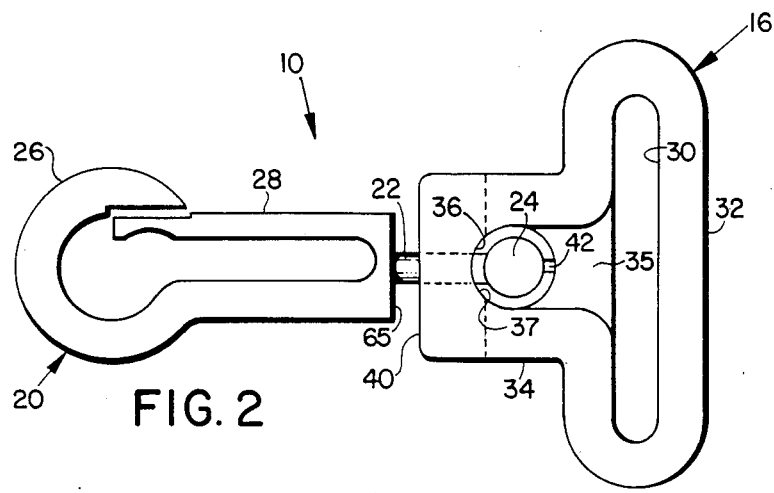
FIG. 2
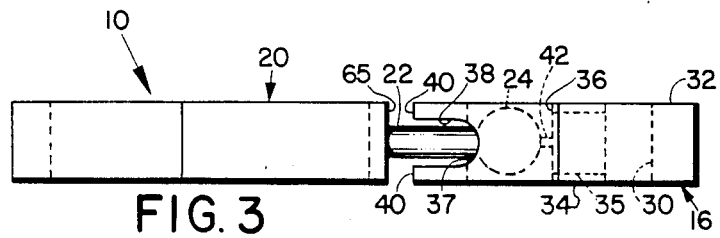
FIG. 3
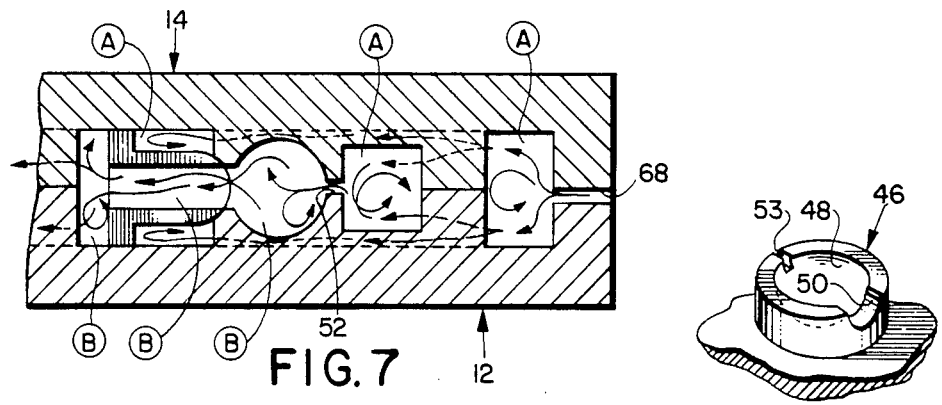
FIG. 7
FIG. 6
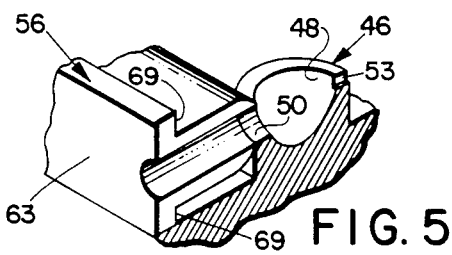
FIG. 5

PLASTIC SWIVEL CONNECTOR AND MOLD THEREFOR

BACKGROUND OF THE INVENTION

This invention generally relates to the field of plastic injection molding but, more particularly, to complementary mold and article architectures that permit fabrication by one-shot processes.

Injection molding in plastic is a well-established mass production technique in which a heated plastic material, usually a thermoplastic, is first forced under pressure into a mold until the fluid plastic completely fills the internal cavity defined by the mold parts and is shaped thereby to provide the desired article geometry. Afterward with cooling, the plastic solidifies. Then, the mold is opened, and the article is ejected.

This technique is very economical for fabricating parts in quantity where the material properties of plastic will suffice for the particular application since the cost of the mold can be distributed over a large number of parts to reduce individual piecepart cost. In addition, more or less complex geometry can be handled, and production rates can be enhanced through the use of multicavity molds.

Despite the attractiveness of the plastic injection molding process, it has its limitations, like other processes. Among these appears to be the inability within the present state of the art to fabricate in only one-shot multicomponent articles having relative movement between components. As a result, the fabrication of such articles is relatively more expensive because of the additional costs associated with longer cycle times and post molding assembly operations.

There are a number of examples in the literature, however, which do illustrate some of the possibilities for two-shot molding processes. For example, in U.S. Pat. No. 3,961,770 to Wrasman, there is shown a plug valve comprising an inner plug that is formed first and afterward a housing formed around it.

U.S. Pat. No. 3,995,822 to Einhorn et al. and No. 2,577,350 to Morin likewise show similar two-shot approaches where a first part is molded and then a second molded over that to provide a final article in which both parts are moveable with respect to one another.

Consequently, it is a primary object of the present invention to provide article and mold architectures which permit the one-shot molding of articles having two or more parts that are relatively moveable with respect to one another.

It is another object of the present invention to provide a mold architecture by which swivel connectors can be easily injection molded of plastic in a one-shot process.

It is still another object of the present invention to provide a swivel connector that can be easily injection molded of plastic in a one-shot process.

Other objects of the invention will in part be obvious and will in part appear in the detailed description that follows.

SUMMARY OF THE INVENTION

This invention generally relates to the field of plastic injection molding but, more particularly, to the the complementary nature of the architectures of a swivel connector and a mold which permit the connector to easily be injection molded in a one-shot process with substantial reductions in cycle time and post molding operations compared with other injection molding processes for fabricating parts of similar complexity and function.

The connector serves to releasably couple articles and, in preferred form, comprises two major parts or components with one attachable to a garment bag strap, or the like, and the other clippable to a ring on the bag. Of the two connector major parts, one, the body, is larger and includes a closed loop for receiving the garment bag strap. The other, the clip section includes a clip consisting of a hook that can be opened and closed via a cantilevered resilient finger that is biased to normally keep the hook closed. The clip is connected with a neck which in turn terminates in a head that is trapped in the body to prevent the body and clip section from separating while permitting relative rotatory motion between them.

The body has within it two intersecting spaces that provide access for interfacing cavity portions which define the connector swivel features and, along with other cavity surfaces, permit the connector major parts to be molded in sequential fashion within the cavity while retaining their identity as separate rotatable parts upon ejection.

High-performance engineering thermoplastics such as the acetals or equivalents with high tensile strength, resiliency, stiffness, and deformation recovery characteristics are the preferred materials for fabricating the connector but others may be used depending upon the requirements of the application.

DESCRIPTION OF THE DRAWINGS

The invention is set forth with particularity in the appended claims. However, its structure, function, and method of fabrication, along with other advantages thereof, may best be understood with reference to the description which follows when read in connection with the drawings wherein like numbers have been used in the various figures to denote the same part, and wherein:

FIG. 2 is an enlarged plan view of the swivel connector of the invention;

FIG. 3 is an enlarged elevational view of the swivel connector of FIG. 2;

FIG. 5 is a diagrammatic perspective of two mold part fragments showing them in operative combination with one sectioned along a longitudinal centerline of the mold parts;

FIG. 6 is a diagrammatic perspective of a fragment of one of the mold parts of FIG. 1;

FIG. 7 is an enlarged, diagrammatic elevational view, partly in section, of fragments of the mold parts of FIG. 1 shown in their closed molding relationship where the section is taken through the longitudinal centerline of the mold parts.

DETAILED DESCRIPTION

This invention generally relates to the fabrication of articles by plastic injection molding but particularly to the structural arrangement of a swivel connector and a corresponding mold which have complementary architectures that make it possible to fabricate the connector in a process where the mold is opened and closed only once during the molding cycle, i.e., a one-shot process.

Figure 1:
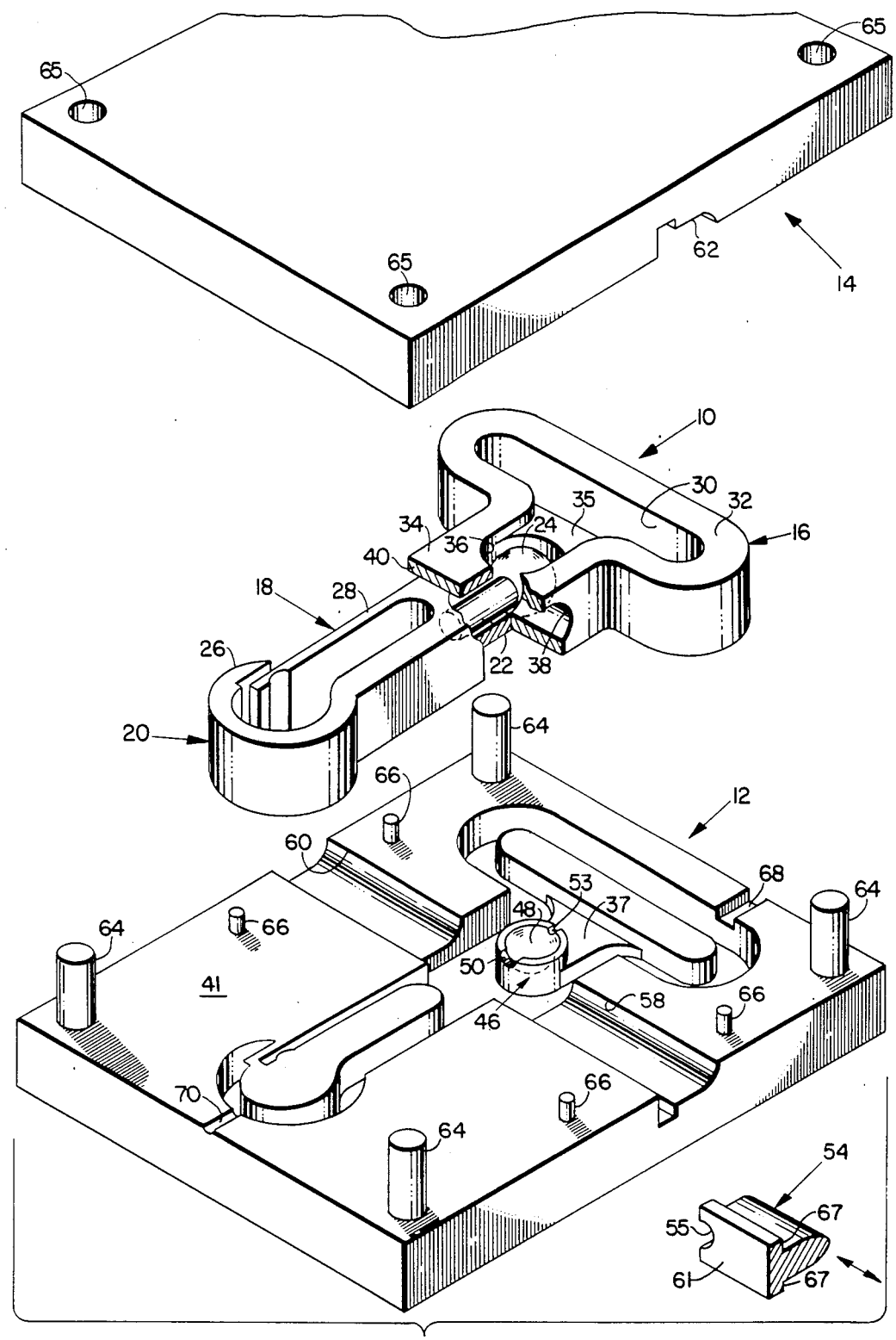
FIG. 1 is an exploded and enlarged diagrammatic perspective of the swivel connector of the invention shown in combination with various mold parts for fabricating it.

To best understand the nature of the connector and mold architectures, reference in now made to FIG. 1 where the swivel connector of the invention is designated at 10, and the mold is shown in its two halves, the lower or stationary half or part 12 and the upper or moveable half or part 14.

Swivel connector 10, integrally formed of a plastic material, comprises two major parts or components that, within limits, can't be pulled apart but can be relatively rotated with respect to one another. These major parts are the main body 16 and the clip section 18.

Clip section 18 includes an elongated clip 20 that consists of a hook 26 and a resilient, cantilevered finger 28 that is biased to normally rest against the tip of hook 26 to provide a locking arrangement by which clip 20 can be positively attached to or released from a ring on a garment bag, or the like, by depressing finger 28 to move it out of contact with the tip of hook 26 thereby allowing hook 26 to be slid off or off a ring. For purposes of clarity the tips of hook 26 and finger 28 are not shown in contact but , in actuality, the mold, as will be seen, is arranged so that finger 28 'springs' against the tip of hook 26 after ejection.

Opposite clip 20 at the other end of clip section 18 is a head 24 in the form of a spherical ball. Connecting head 24 with clip 20 is a neck 22 in the form of an elongated, cylindrical rod.

As shown in FIGS. 2 and 3, main body 16 comprises two generally parallelopiped-shaped sections, 32 and 34 respectively, arranged in a "T" format. Section 32 has an elongated aperture 30 extending through it from one to the other of its largest sides to form a closed loop for receiving a strap or belt from a garment bag or the like.

Figure 4:
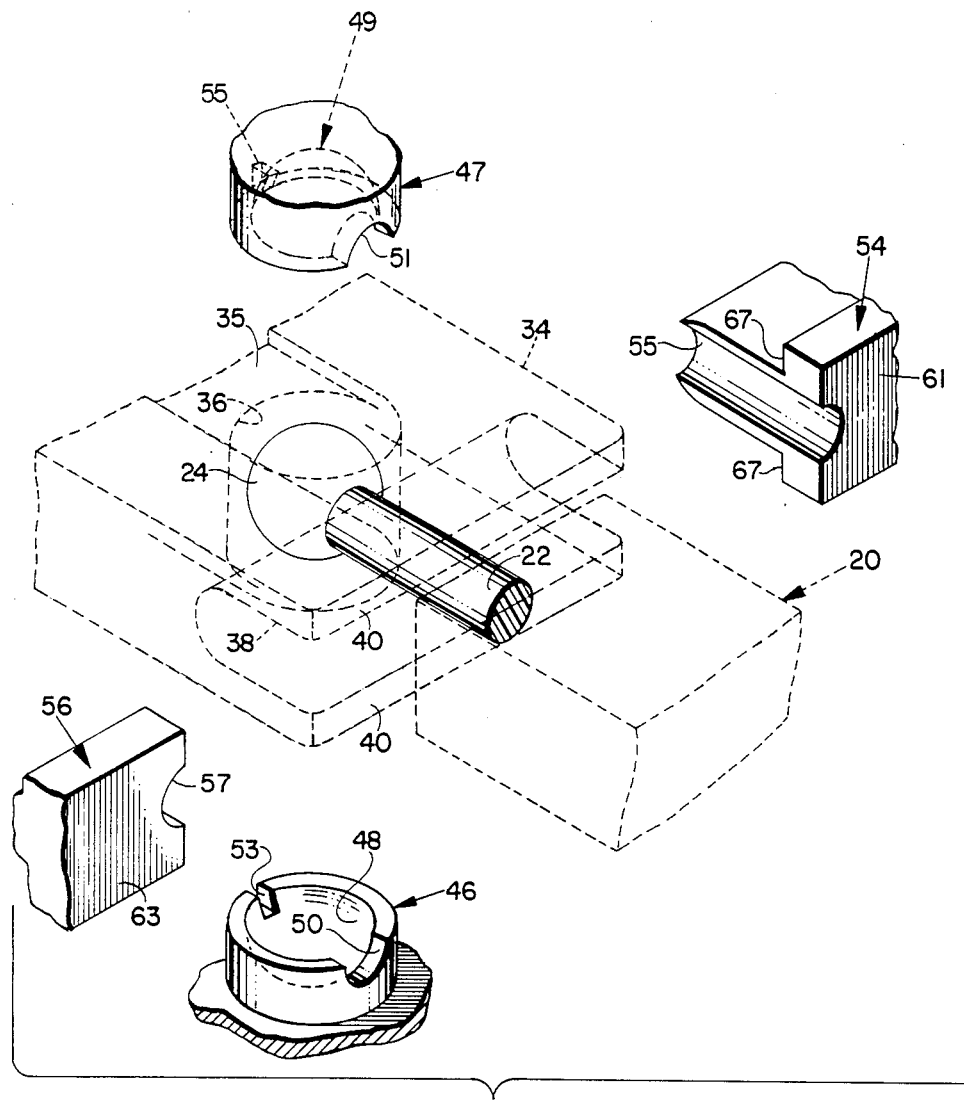
FIG. 4 is an exploded and enlarged diagrammatic perspective showing portions of the swivel connector of the invention with fragments of the mold parts of FIG. 1 where the connector portions are shown partly in solid and partly in phantom and the mold fragments are shown in solid.

Referring now to FIG. 4, along with FIGS. 1-3, it can be seen that section 34 has a cylindrical bore hole 36 extending straight through its major sides. And, in the narrow side of section 34, side 40 facing clip 20, there is an elongated slot 38 extending the length of side 40 and recessed sufficiently deep so that it intersects bore 36 at right angles. Where slot 38 intersects bore 36 two things take place. First, as one would expect, an aperture 37 is formed between the two. The shape of the aperture 37 is in the form of an oval which is wrapped around the cylindircal plane of the bore 36 and is dimensioned to be large enough so that the neck 22 will fit through it to connect with head 24 and clip 20. However, aperture 37 is also dimensioned to be smaller than the radius of the spherical head 24 so that head 24 cannot pass through.

Secondly, the intersection of slot 38 with bore 36 defines a volume of space that is inside of main body 16 and common to the two. Since a mold and part have complementary geometry, the absence of material in one implies the presence of material in the other. Thus, this intersecting volume of space on the interior of main body 16 provides a common spatial access through which mold surfaces can simoultaneously be brought into mating relationship to form head 24 and portions of neck 22. In this manner, head 24 can be made inside of bore 36 but outside of contact with its interior surfaces with the portion of neck 22, similarly formed, extending into the space of the slot 38 where it can be further extended to connect with clip 20.

Thus, the spatial arrangement between bore 36 and slot 38 is a major feature of the architecture of swivel connector 10. Bore 36 creates the opportunity for mating mold surfaces along one direction while slot 38 the opportunity for mating mold surfaces along another direction. Where the two intersect is a common space which allows for the formation of portions of one of the connector's major parts inside of the other such that the connector parts can't be pulled apart but can be relatively rotated.

The force with which the connector's major parts, 16 and 18, can be pulled apart is a function of a variety of factors including the geometry of head 24 and neck 22 and the material used in molding connector 10. For optimum pulling strength, geometric considerations aside, the preferred material is a high-performance engineering plastic such as an acetal or equivalent having high tensile strength and good stiffness and flexibility characteristics. Acetals such as those manufactured by E.I. Dupont de Nemours under its tradename Delrin have been found satisfactory. However, if optimizing separation strength is not a major concern for a particular application, then other thermoplastics of lower performance may be used to advantage.

The mold that is used to form connector 10 in only one-shot is structured to exploit the spatial opportunities made available through the architecture of connector 10. It comprises lower and upper halves, 12 and 14, respectively. These two halves, 12 and 14, are adapted to mate with one another in a plane 41 to define about plane 41 a cavity generally designated as 15. Cavity 15, only half of which is shown, is generally bilaterally symmetric about plane 41 and has a geometric shape that is substantially the complement of that of component 10. Although not explicitly shown, it will be understood that upper mold half 14 includes cavity defining surfaces which correspond to those in lower mold half 12. The cavity defining surfaces of mold halves, 12 and 14, cooperate to define substantially one-half of the connector major parts, 16 and 18. However, portions of the cavity for forming connector 10, particularly part of its neck 22, the slot 38 and side 40, and the end of clip 20 facing head 24, are defined by a pair of sliders, 54 and 56 respectively, that move in and out of a pair of corresponding guides, 58 and 60 respectively, located in lower stationary mold half 12.

As is readily apparent from observing FIG. 1, each of the mold halves, 12 and 14, include surfaces which have a more or less one-to-one correspondence in detail with each of the major parts of connector 10. These include, toward the forward end facing the page, surfaces which define the clip 20 except for one end, its end 65 facing head 24.

Towards the rear end of cavity 15 are surfaces which define the exterior geometry of connector main body 16 except for its side 40, slot 38, and bore 36 but including its closed loop section 32 along with aperture 30.

The surfaces which define head 24, bore 36, and a portion of neck 22 are carried on a pair of pedestals, 46 and 47, which are best illustrated in FIG. 4. Each pedestal, 46 and 47, is an integral part of each mold part, 12 and 14, respectively, as best illustrated by FIG. 1.

Each pedestal, 46 and 47, includes a hemispherical cup which in pedestal 46 is designated as 48 and in pedestal 47 as 49. At the forward end of each pedestal, 46 and 47, are semicylindrical cutouts, 50 and 51, respectively, and at their rear ends are slots, 53 and 55, respectively.

When the two mold halves are brought together in plane 41, pedestals, 46 and 47, cooperate to simoultaneously define head 24, bore 36 and portions of neck 22. In addition, they also define another detail which is important to the one-shot operation of the mold. Slots, 53 and 55, provide a small thin passageway or sprue that allows plastic to travel between the connector's major parts, 16 and 18, during a molding cycle as best seen in FIG. 7 where the small sprue is designated as 52. Here, it can be seen that sprue 52 connects the cavity space for forming head 24 with the cavity space for forming portions of the main body 16. In particular, the main body has a depressed region 35 which is formed in the cavity by corresponding surfaces such as that shown in FIG. 1 as 37. As best seen in FIGS. 2 and 3, it is the depressed region 35 that is connected with the head 24. Because of this arrangement, a small tab 42 (FIGS. 2 and 3) is formed between the connectors major parts, 16 and 18, but it is designed to be so fragile that the first slight disturbance breaks it to allow the parts, 16 and 18, to freely rotate with respect to one another.

To complete the definition of connector 10 are the pair of side action sliders, 54 and 56, which are carried permanently on the lower mold half 12 in a pair of corresponding guides, 58 and 60, respectively, for movement into and out of cavity 15 along directions that are perpendicular to the general direction in which mold halves, 12 and 14, travel when opening and closing. In this connection, upper mold half 14 also includes complementary shaped slots for receiving sliders, 54 and 56. However, only one of these is shown as 62 in FIG. 1.

Sliders, 54 and 56, include a number of surfaces which form the remainder of connector 10. In particular, it can be seen from the figures that the outside shape of sliders, 54 and 56, are for forming the recessed slot 38. In addition, the back sides of sliders, 54 and 56, designated generally as 61 and 63 respectively form the side of clip 20 facing head 24, i.e. the side designated as 65 in FIGS. 2 and 3.

Also included on sliders, 54 and 56, are surfaces which complete the formation of side 40 of main body 16. These surfaces are shown as 67 and 69, respectively, in FIGS. 1, 4 and 5.

Finally, each slider, 54 and 56, has a semicylindrical elongated slot, 55 and 57, respectively, for forming the remainder of neck 22 and completing its connection between head 24 and clip 20.

As best seen in FIGS. 1 and 7, the lower mold half 12 includes a sprue 68 for feeding plastic first into that part of cavity 15 corresponding to the connector main body 16, i.e., the larger part. At the end opposite there is provided a vent 70 to allow air trapped in cavity 15 to escape while molding. Although only one vent is included for purposes of illustration, it will be understood that vents can be provided anywhere that it appears necessary in the mold and these, where used, would normally be embodied in the mold halves, 12 and 14, as small slots at the parting line, plane 41.

Mold parts, 12 and 14, are preferably made of a high quality steel and preferably include heaters, not shown, in the form of hot water lines to keep the temperature of the mold parts at approximately 150-degrees F during the molding cycle to assure that plastic can easily flow throughout cavity 15 as necessary.

As is the usual practice, mold halves, 12 and 14, are carried on a pair of frames (not shown) that are toggled together to bring them into registration and clamp them together during the injection molding process. For proper registration, mold halves, 12 and 14, are provided with a guiding system in the form of posts, 64 and 66, in lower half 12 which mate with corresponding holes designated generally as 65 in upper mold half 14.

During the molding cycle, fluid plastic at between 425 to 450-degrees F is forced into cavity 15 at a pressure of between 10,000 and 20,000 psi via sprue 68 as indicated by the swirling arrows in FIG. 7. During the cycle mold halves, 12 and 24, are clamped together as previously described. The parts of cavity 15 labeled with the circled A in FIG. 7 correspond to those sections of cavity 15 which form connector main body 16 and those with the circled B to connector clip section 18. As can be appreciated, the fluid plastic first enters the A-portion entirely filling it, or nearly so. Once this happens, the pressure in the A-portion builds up rapidly until the plastic 'sees' secondary sprue 52 connecting the A and B portions of the mold. Having seen sprue 52, the plastic is forced through it at high pressure into the B-portion getting reheated as it passes through the small passageway that is sprue 52. All the while, cavity 15 is being vented as the fluid plastic courses through it.

After cavity 15 is filled, connector 10 is allowed to cool and is ejected form the mold in any usual way. Tab 42 which was formed by secondary sprue 52 is then easily broken or it can be left intact to be broken easily at the first use of connector 10.

As mentioned before, cantilevered finger 28, upon removal from the mold, is normally biased against the tip of hook 26. This is accomplished in the mold by intentionally arranging those portions of cavity 15 used to form finger 28 so that finger 28 is ejected in interfering relationship with the tip of hook 26.

Figure 8:
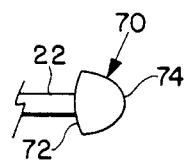
FIG. 8 is a diagrammatic, elevational view of an alternative embodiment for a portion of one of the swivel connector's major parts.

It will be appreciated by those skilled in the art that changes may be made to the invention without departing from its scope. For example, if one wants to increase the force required to pull apart the connector major parts through purely geometric means, an alternate head design such as that illustrated in FIG. 8 may be used. Here, the alternate head 70 is in the form of a segment of an ovoid with a acorn shape. The base ovoid 74 is intersected by a spherical surface 72 that has a radius of curvature that is shallower than that of the head 24. The shallower curvature reduces the camming action of the head against the surfaces which act against it when trapped inmain body 16. Consequently, it requires more force to pull this design apart. In addition, it will be obvious that other clip designs can be contrived, and the angular range of motion of the two parts can be controlled by manipulation of appropriate part geometry.

What is claimed is:

1. A swivel connector comprising two major parts that are injection molded of plastic in a one-shot injection molding process such that said major parts, within limits can't be pulled apart but are free to rotate with respect to one another, one of said major parts including a clip for releasably attaching to a ring and the other of said major parts including portions which define a other of said major parts including portions which define a loop for attachment to a strap or the like, said one major part further including a neck that extends from said clip and terminates in a head at one end of said one major part and wherein said other major part includes other portions which define an interior space in which said head and portions of said neck are formed during the injection molding process, said interior space of said second major part opening to the exterior of said second major part along an axis in one direction to provide access for the formation of said head and along another direction, different from said one direction, to provide access for the formation of at least part of said neck where said neck and said head join, said second major part having a generally flat parallelopiped shape with a cylinderical bore extending through the largest opposed sides thereof along said axis in said one direction and a recessed slot in an edge thereof extending along said other direction, said slot and said bore being arranged so that they intersect one another to define said interior space of said second major part.

2. The swivel connector of claim 1 wherein said head is generally spherical in shape and is formed inside of said cylinderical bore and wherein said neck is in the form of an elongated cylindrical rod that is generally perpendicular to said bore.

3. The swivel connector of claim 1 wherein said head is a segment of an ovoid and wherein said neck is in the form of an elongated cylinderical rod that is generally perpendicular to said bore.

4. A swivel connector comprising two major parts that are injection molded of plastic in a one-shot injection molding process such that said major parts, within limits, can't be pulled apart but are free to rotate with respect to one another, one of said major parts including a clip for releasably attaching to a ring and the other of said major parts including portions which define a loop for attachment to a strap or the like, said one major part further including a neck that extends from said clip and terminates in a head at one end of said one major part, said other major part including other portions which an interior space in which said head and portions of said neck are formed during the injection molding process.

5. The swivel connector of claim 4 wherein said interior space of said second major part opens to the exterior of said second major part along an axis in one direction to provide access for the formation of said head and along another direction, different from said one direction, to provide access for the formation of at least part of said neck where said neck and said head join.

6. A swivel connector comprising two major parts that are structured and arranged with respect to one another to provide a swivel connector architecture that can be injection molded of plastic in a one-shot injection molded process such that said major parts, within limits, can't be pulled apart but are free to rotate with respect to one another, one of said major parts including a clip for releasably attaching to a ring and the other of said major parts including portions which define a closed loop being generally elongated with said clip at one end and further including a head at the other end thereof connected to said clip by an elongated neck and wherein said other major part further includes other portions which define an interior space in which said head and portions of said neck can be formed out of contact therewith during the injection molding process, said interior space of said second major part opening to the exterior thereof along an axis in one direction to provide access for the formation of said head and along another direction, different from said one direction, to provide access for the formation of a least part of said neck near where said neck and head join, said second major part having a generally flat parallelopiped shape with a cylindrical bore extending through the largest opposed sides thereof along said axis in said one direction and a recessed slot in an edge thereof extending along said other direction, said slot and said bore being arranged so that they intersect one another to define said interior space of said second major part.

7. The swivel connector of claim 6 wherein said head is generally spherical in shape and is formed inside of said cylinderical bore and wherein said neck is in the form of a elongated cylindrical rod that is generally perpendicular to said bore.

8. The swivel connector of claim 6 wherein said head is a segment of an ovoid with its truncated end facing said clip.

9. A swivel connector comprising two major parts that are structured and arranged with respect to one another to provide a swivel connector architecture that can be injection molded of plastic in a one-shot injection molding process such that said major parts, within limits, can't be pulled apart but are free to rotate with respect to one another, one of said major parts including a clip for releasabley attaching to a ring and the other of said major parts including portions which define a closed loop for attachment to a strap or the like, said one major part being generally elongated with said clip at one end and further including a head at the other end thereof connected to said clip by an elongated neck, said other major part further including other portions which define an interior space in which said head and portions of said neck can be formed out of contact therewith during the injection molding process.

10. The swivel connector of claim 9 wherein said interior space of said second major part opens to the exterior thereof along an axis in one direction to provide access for the formation of said head and along another direction, different from said one direction, to provide access for the formation of a least part of said neck near where said neck and head join.

11. A mold for fabricating in only one-shot a plastic article comprising two major components that, within limits, can't be pulled apart but can be relatively rotated with respect to one another where one of the major components includes a head connected to a neck, said mold comprising two mold parts that are adapted to mate with one another to define therebetween a cavity in which said article is to be formed by injection of plastic therein, each of said mold parts having cooperative surfaces which together define opposing portions of said article, said cooperative surfaces including:
   (a) surfaces which definemost of one of said article components except for one portion facing in a given direction,
   (b) surfaces which define most of the exterior of said other article component except for one portion which faces said one portion of said one component,
   (c) surfaces which define within the interior of said other component said head and portions of said neck so that said head is trapped therein unable, within limits,to be pulled out of said other component but rotatable with respect thereto,
   (d) surfaces which define a small conduit between said head and portions of said other component to permit fluid plastic to flow between them, and (e) moveable surfaces for forming the remainder of said neck so that it is connected between said head and said one component.

12. A mold for fabricating in only one-shot a plastic swivel connector comprising two major parts that, within limits, can't be pulled apart but can be relatively rotated with respect to one another where one of the major parts includes a head connected to a neck which in turn is connected to a clip for releasably attaching to a ring and the other major part includes a closed loop for attachment to a strap or the like, said mold comprising two mold halves that are adapted to mate with one another in a plane to define about said plane a cavity in which said swivel connector is to be formed by injection of plastic therein, said mold halves being bilaterally symmetric about said plane and each including corresponding surfaces that cooperate to define substantially one-half of the geometry of said swivel connector major parts, said corresponding surfaces comprising:

(a) surfaces which define said clip except for one end thereof:

(b) surfaces which define the exterior geometry of said other major part except for one end thereof facing said one end of said clip and said closed loop thereof, (c) surfaces which define within the confines of said other major part said head and portions of said neck so that said head, when formed, is trapped within said second major part unable, within limits, to be pulled away from it but rotatable with respect to it, (d) surfaces which define between said head and portions of said second major part a small thin passageway for allowing fluid plastic to flow between the two, and (e) surfaces moveable into and out of said cavity for defining said ends of said second major part and said clip which face one another and for defining the remainder of said neck so that it is connected with said head and said one end of said clip, said mold being thus structured so that one of said major parts is formed prior to the formation of the other during the molding cycle.

13. The mold of claim 12 further including a sprue for feeding plastic into said cavity and vents for releasing air trapped in said cavity during the molding cycle while plastic is being injected into said cavity.

14. The mold of claim 12 wherein said moveable surfaces are arranged to travel into and out of said cavity in directions parallel to said plane.

15. The mold of claim 14 wherein said moveable surfaces form part of two slider members which move into and out of said cavity along the same line but in opposite directions.

* * * * *